E. P. Russell,
Mower.
N°. 2,709.
" 33,713.
Patented Nov. 12. 1861.
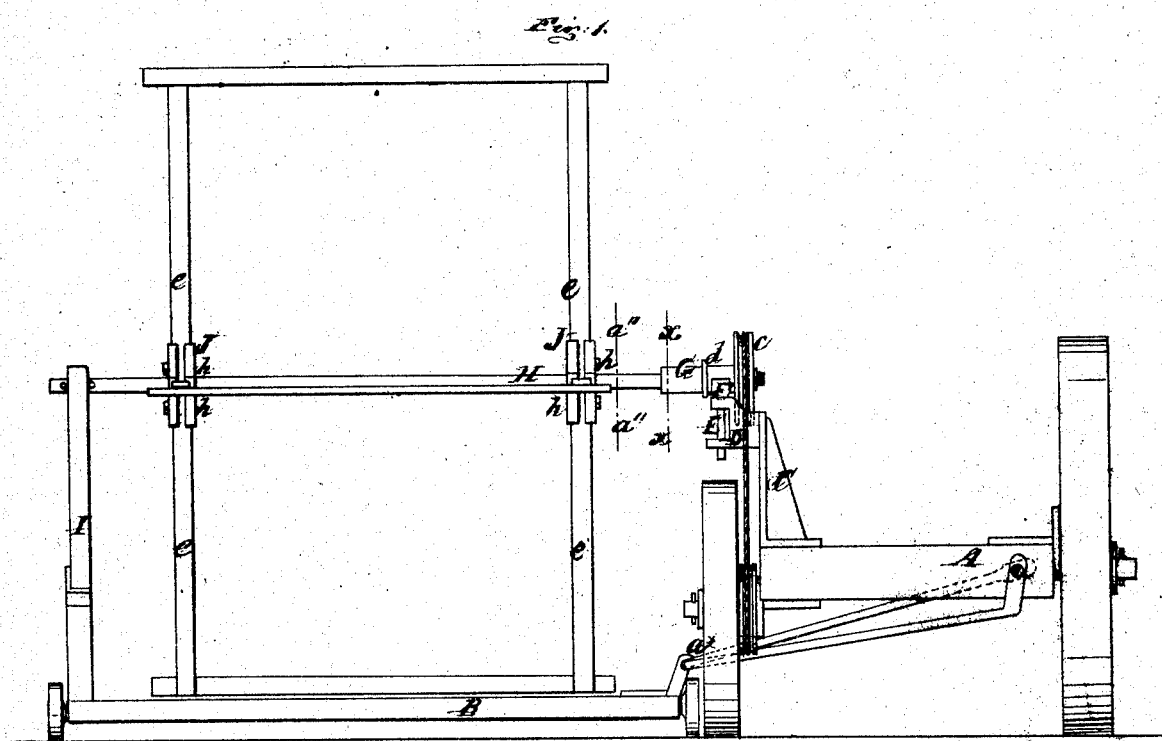
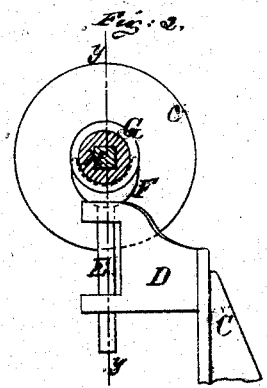
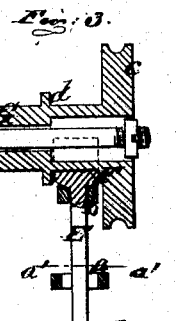
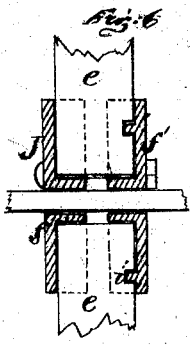
Witnesses.
Inventor.
E. P. Russell
per _____
Attorneys

UNITED STATES PATENT OFFICE.

E. P. RUSSELL, OF MANLIUS, NEW YORK.

IMPROVEMENT IN REELS FOR HARVESTERS.

Specification forming part of Letters Patent No. 33,713, dated November 12, 1861.

*To all whom it may concern:*

Be it known that I, E. P. RUSSELL, of Manlius, in the county of Onondaga and State of New York, have invented a new and useful Improvement in Reels for Harvesters; and I do hereby declare that the following is a full, clear, and exact description of the same, reference being had to the annexed drawings, making a part of this specification, in which—

Figure 1 is a front view of a harvester with my invention applied to it. Fig. 2 is a transverse section of the reel shaft and hub of driving-pulley, taken in the line $x\ x$, Fig. 1; Fig. 3, a longitudinal section of Fig. 2, taken in the line $y\ y$; Fig. 4, a section of Fig. 3, taken in the line $a'\ a'$; Fig. 5, a transverse section of the reel-shaft, taken in the line $a''\ a''$, Fig. 1; Fig. 6, a section of Fig. 5, taken in the line $b'\ b'$; Fig. 7, a detached inner view of one of the plates which form the heads by which the arms of the reel are attached to the shaft.

Similar letters of reference indicate corresponding parts in the several figures.

The object of this invention is to hang the reel-shaft in such a manner that it will play or work as the machine moves along corresponding to the play or movement of the sickle produced by the latter conforming to the irregularities of the surface of the ground. By attaining this object the sickle is allowed to cut the grain at a uniform height, and correspond perfectly to the undulating surface of the ground without racking the reel. The invention has further for its object the fitting or securing of the reel-arms to their shaft, whereby the arms may be readily attached to the shaft and in a very secure manner.

To enable those skilled in the art to fully understand and construct my invention, I will proceed to describe it.

A represents the main frame of a harvester, and B the platform, which has the usual finger-bar and sickle at its front end. This platform is attached to the main frame A by means of a jointed connection, $a^x$, which admits of the platform working freely up and down, so that the sickle may conform to the inequalities of the surface of the ground.

To the main frame A of the harvester there is secured an upright, C, the upper part of which has a horizontal forked arm, D, in which an upright pin, E, is fitted. The pin E passes through two eyes, $a\ b$, in the arm D. The lower eye, $a$, is oblong, as shown clearly in Fig. 4, so that the pin E may work or play laterally. The upper eye, $b$, is not much larger in diameter than the pin; but it is concave at its upper part to receive the under side or lower part of a bearing, F, which is at the upper end of the pin. (See Figs. 1, 2, and 3.) The bearing F supports a small shaft, G, which has a pulley, $c$, at its outer end, the bearing F being between the pulley $c$ and a shoulder, $d$, on the shaft G, as shown clearly in Figs. 1 and 3. The shaft G is tubular, having a square hole through it for the reel-shaft H to pass through, the portion of said shaft which passes through the shaft G being also square and allowed to slide freely in the shaft. The opposite end of shaft G is fitted in the upper end of an inclined bar, I, which is attached to the outer or grain end of the platform B.

From the above description it will be seen that the reel-shaft H cannot interfere with the free undulating movement of the platform in conforming to the irregularities of surface over which it passes, for the reel-shaft H is allowed to work or slide freely in the hollow shaft G, and the bearing F of the latter, in consequence of being attached to the pin E, and the latter arranged as shown, is allowed to turn and work like a universal or ball-and-socket joint.

The reel-shaft H is of iron, and upon it there are placed two metal heads, J J. These heads J serve as a means for securing the arms $e$ of the reel to the shaft H. Each head J is formed of two parts, $f f'$, and these parts have each four radial grooved arms, $g$, (see Fig. 7,) which arms receive the ends of the reel-arms $e$, said arms being of wood. The two parts $f f'$ of the heads are secured together by bolts $h$, and the inner side of one part of each head is provided with lips or projections $i$, which fit in the sides of the reel-arms $e$, when the parts $f f'$ are bolted together and prevent the arms from drawing out from the heads. (See Fig. 6.) By this arrangement the reel-arms $e$ may be secured to the reel-shaft H with great facility and very securely. The heads J are prevented from turning on the shaft H by means of screw-bolts $j$, which pass radially into one part $f$ or $f'$ of each head, and are secured firmly against the shaft. (See Fig. 5.)

Having thus described my invention, what I claim as new, and desire to secure by Letters Patent, is—

1. The arrangement and combination of the hollow or tubular shaft G of the driving-pulley c, the bearing F on the pin E, and the sliding reel-shaft H, substantially as and for the purpose set forth.

2. Attaching the arms e to the reel-shaft H through the medium of the metal heads J J, formed each of two parts, $f\ f'$, provided with radial grooves $g$, having lips $i$, bolted together by the bolts $h$, and secured to the shaft H by the bolts $j$, substantially as described.

E. P. RUSSELL.

Witnesses:
 PORTER TREMAINE,
 AUG. TREMAINE.